UNITED STATES PATENT OFFICE

JACOB ADLER, OF HACKENSACK, NEW JERSEY, ASSIGNOR OF ONE-HALF TO WILLIAM ADLER, OF NEW HAVEN, CONNECTICUT

CONSTRUCTION MATERIAL

No Drawing.   Application filed February 5, 1932.   Serial No. 591,234.

This invention relates to new and useful improvements in a construction material for walls, ceilings and the like.

This invention is a continuation in part of my application, Serial No. 435,627, filed March 13, 1930.

This invention has for an object the provision of material of the class mentioned which is characterized by the inclusion or combination of ingredients forming a construction of satisfactory strength at a minimum cost, and having the ability of receiving nails driven into it.

As another object of this invention it is proposed to construct the material so that when set and dry it is very porous so as to allow air circulation. An advantage gained in this construction is that it permits heat radiation. Another advantage is that a wall constructed according to the invention is more or less ventilated.

More particularly, the invention proposes the use of some natural porous stone such as trachyte tuff and slaked lime. Any porous stone may be used provided it has a great majority of its pores connected for allowing for the passage of air. Such stones are found in volcanic regions, all different types being present, but the pores of some are not connected so that care must be exercised to select that type in which they are.

When trachyte tuff stone and slaked lime are used in one preparation the setting of the composition is such that when it is exposed to the air, the slaked lime loses water and absorbs carbon dioxide so as to open the pores within the composition and provide the porous condition before mentioned. The exchange of carbon dioxide for the water also cleans out the pores of the trachyte tuff and thus insures the circulation depended upon.

The invention further proposes the mixture of washed sand with the trachyte tuff for the purpose of cheapening the product by reducing the quantity of binder material necessary in the construction of the material.

For further comprehension of the invention and of the davantages thereof, reference will be had to the following description and to the appended claims in which the various novel features of the invention are more particularly set forth.

The invention consists in the use of Portland cement, slaked lime, a natural porous stone, rough sand which is clay-proof, and a solution of washing soda in water, and to enable others to make use of my invention I give the following as one of the most approved formulas for maintaining the same.

Place in any suitable container 1000 lbs. of trachyte tuff or similar volcanic stone and to this add 600 lbs. of rough sand (washed, and of the clay-proof type, that is, sand having no or very little traces of clay). Thoroughly mix these ingredients together. The trachyte tuff should be broken up into small pieces varying from $\frac{1}{16}$ of an inch upwards to $\frac{1}{4}$ of an inch in any overall size depending upon the fineness of the finished material desired. To this mixture add 100 lbs. of Portland cement and 50 lbs. of slaked lime. From 2% to 5% (by weight) which corresponds with 35 lbs. to 87.5 lbs., of soda and water should next be added, which mixture may be prepared by mixing proportionally 25 lbs. of soda ($Na_2CO_3$) in two (2) gallons of hot water.

The slaked lime should be of the "fat" variety. The above ingredients are then thoroughly mixed and it will be noted that the beton is light in weight, quite moist and capable of being formed into blocks or used in other desirable manner. When it is exposed to air for a short period of time, it sets and becomes hard. The slaked lime discharges water and absorbs carbon dioxide gas from the atmosphere and in so doing opens multitudes of pores within the material so that it is of light weight. Due to the fact that washed sand of the clay-proof variety is used, the exchange of water and carbon dioxide will leave a majority of the natural pores within the trachyte tuff unobstructed by the binder material.

Specimens tested composed from the ingredients stated above showed that in 7 days time they attained a strength of 1100 lbs. per square inch in compression. In 28 days they attained a strength of 2500 lbs. per square inch. The cement and lime are used so as to attain the greater strength. The solution of soda and water produces the characteristic that nails may be driven into the material when set.

While I have described my invention with some degree of particularity, I realize that in practice various alterations therein may be made. I therefore reserve the right and privilege of changing the form or details of construction or otherwise altering the arrangement of the correlated parts without departing from the spirit or the scope of the appended claims.

Having thus described my invention, what I claim as new and desire to secure by United States Letters Patent is:—

1. A composition comprsing a mixture of approximately 57% of trachyte tuff, approximately 34% of sand washed so as to be free of clay, approximately 5.7% of Portland cement, approximately 2% of soda, said proportions being by weight, and a sufficient quantity of water to cause the mixture to set.

2. A composition consisting of a mixture of approximately 57% of trachyte tuff, approximately 34% of sand washed so as to be free of clay, approximately 5.7% of Portland cement, approximately 2% of soda, approximately 2.9% of slacked lime and a sufficient quantity of water to cause the mixture to set.

In testimony whereof, I have affixed my signature.

JACOB ADLER.